US011628475B2

(12) United States Patent
Dumbaugh

(10) Patent No.: US 11,628,475 B2
(45) Date of Patent: Apr. 18, 2023

(54) VIBRATING SCREEN FEEDER PROCESS

(71) Applicant: KINERGY CORPORATION, Louisville, KY (US)

(72) Inventor: George D Dumbaugh, Louisville, KY (US)

(73) Assignee: Kinergy Corporation, Louisville, KY (US)

( * ) Notice: Subject to any disclaimer, the term of this patent is extended or adjusted under 35 U.S.C. 154(b) by 0 days.

(21) Appl. No.: 17/130,339

(22) Filed: Dec. 22, 2020

(65) Prior Publication Data

US 2021/0213485 A1  Jul. 15, 2021

Related U.S. Application Data

(63) Continuation of application No. 15/741,655, filed as application No. PCT/US2016/000056 on Jul. 5, 2016, now abandoned.

(Continued)

(51) Int. Cl.
*B07B 1/44* (2006.01)
*B65G 27/32* (2006.01)
(Continued)

(52) U.S. Cl.
CPC ............... *B07B 1/44* (2013.01); *B07B 1/28* (2013.01); *B07B 1/42* (2013.01); *B07B 1/50* (2013.01); *B65G 27/04* (2013.01); *B65G 27/20* (2013.01); *B65G 27/26* (2013.01); *B65G 27/30* (2013.01); *B65G 27/32* (2013.01); *F23H 9/04* (2013.01);
(Continued)

(58) Field of Classification Search
CPC ........... B07B 1/28; B07B 1/282; B07B 1/284; B07B 1/34; B07B 1/343; B07B 1/42; B07B 1/44; B07B 1/50; B07B 2201/04; B65G 27/04; B65G 27/20; B65G 27/26; B65G 27/30; B65G 27/32; B65G 2201/045; B65G 2201/047
See application file for complete search history.

(56) References Cited

U.S. PATENT DOCUMENTS 3,528,541 A  9/1970  Barton et al.
3,724,819 A  4/1973  Varnum
(Continued)

FOREIGN PATENT DOCUMENTS

GB  588710  6/1947
GB  1191491  5/1970

*Primary Examiner* — Joseph C Rodriguez
(74) *Attorney, Agent, or Firm* — Carrithers Law Office, LLC; David W. Carrithers

(57) ABSTRACT

A vibrating screen feed conveying apparatus for conveying and separating sticky "moisture laden bulk solids" which are sticky and wet flowing onto a vibrating screening feeder and into a hopper. The apparatus includes a bed on which material is conveyed, a longitudinal counterbalance supported on a plurality of isolation springs, a plurality of inclined drive springs extending between the bed and the longitudinal counterbalance, and a plurality of stabilizers for controlling movement of the drive springs along their central axes. A plurality of vibratory motors, each having rotatable eccentric weights are attached to the rear end of the longitudinal counterbalance. The eccentric weights rotate in phase with one another to vibrate the bed at a vibration frequency.

12 Claims, 11 Drawing Sheets

Related U.S. Application Data

(60) Provisional application No. 62/493,460, filed on Jul. 2, 2016, provisional application No. 62/231,330, filed on Jul. 3, 2015.

(51) Int. Cl.

| | | |
|---|---|---|
| *F23H 9/04* | (2021.01) | |
| *B07B 1/50* | (2006.01) | |
| *B07B 1/28* | (2006.01) | |
| *B07B 1/42* | (2006.01) | |
| *B65G 27/04* | (2006.01) | |
| *B65G 27/20* | (2006.01) | |
| *B65G 27/26* | (2006.01) | |
| *B65G 27/30* | (2006.01) | |
| *F23K 1/00* | (2006.01) | |
| *B02C 23/02* | (2006.01) | |
| *B02C 23/08* | (2006.01) | |

(52) U.S. Cl.
CPC ............... *F23K 1/00* (2013.01); *B02C 23/02* (2013.01); *B02C 23/08* (2013.01); *B07B 2201/04* (2013.01); *B65G 2201/045* (2013.01); *B65G 2201/047* (2013.01)

(56) References Cited

U.S. PATENT DOCUMENTS

| | | | |
|---|---|---|---|
| 3,960,731 A | 6/1976 | Brandt | |
| 4,015,705 A | 4/1977 | Dumbaugh | |
| RE29,512 E | 1/1978 | Musschoot | |
| 4,288,320 A | 9/1981 | Wilson | |
| 4,492,629 A | 1/1985 | Dumbaugh | |
| 4,774,893 A * | 10/1988 | Dumbaugh | F23K 3/00 198/771 |
| 5,051,171 A | 9/1991 | Hukki | |
| 5,397,002 A | 3/1995 | Lambert | |
| 5,615,763 A | 4/1997 | Schieber | |
| 5,713,457 A | 2/1998 | Musschoot | |
| 6,220,447 B1 | 4/2001 | Lambert | |
| 6,415,913 B2 | 7/2002 | Sleppy | |
| 6,439,374 B2 | 8/2002 | Kroger | |
| 6,601,695 B1 | 8/2003 | Rosenstrom | |
| 6,655,523 B2 * | 12/2003 | Jones | B65G 27/08 198/771 |
| 6,705,459 B1 | 3/2004 | Musschoot | |
| 6,851,548 B1 * | 2/2005 | Dumbaugh | B65G 27/32 198/758 |
| 6,948,611 B2 | 9/2005 | Sumbaugh | |
| 6,991,092 B2 | 1/2006 | Chojnacki | |
| 7,387,198 B2 | 6/2008 | Thomson | |
| 7,426,991 B1 | 9/2008 | Cedzo | |
| 7,472,898 B2 | 1/2009 | Kraus | |
| 7,540,694 B2 | 6/2009 | Markowski | |
| 7,712,513 B1 | 5/2010 | Mitchesll | |
| 8,051,974 B2 | 11/2011 | Boeger | |
| 8,096,406 B1 | 1/2012 | Mitchell | |
| 8,733,539 B2 * | 5/2014 | Choy | B65G 27/02 198/757 |
| 8,733,540 B2 * | 5/2014 | Woiler | B65G 27/28 198/766 |
| 8,770,389 B2 | 7/2014 | Millard | |
| 9,254,965 B2 * | 2/2016 | Groenewald | B65G 27/04 |
| 9,481,525 B1 * | 11/2016 | Dunham | B65G 27/20 |
| 11,142,409 B1 * | 10/2021 | Karpinsky | B65G 47/74 |
| 2005/0023111 A1 | 2/2005 | Dumbaugh | |
| 2008/0276843 A1 | 11/2008 | Sund et al. | |
| 2014/0097065 A1 | 4/2014 | Woiler | |
| 2014/0291214 A1 | 10/2014 | Vasquez | |
| 2021/0213485 A1 * | 7/2021 | Dumbaugh | B07B 1/44 |

* cited by examiner

US 11,628,475 B2

VIBRATING SCREEN FEEDER PROCESS

CROSS REFERENCES TO RELATED APPLICATIONS

This is a Continuation application of U.S. application Ser. No. 15/741,655 filed on Jul. 5, 2016 claiming priority from PCT/US2016/000056 filed on Jul. 5, 2016 which claims priority from U.S. Provisional Application Ser. No. 62/493,460 filed on Jul. 2, 2016 and U.S. Ser. No. 62/231,330 filed on Jul. 3, 2015 all of which are incorporated by reference herein in their entirety.

TECHNICAL FIELD

The present invention relates to the field of industrial vibrating screens for separating small elements from large elements, such as in the case of coal or stone.

BACKGROUND OF THE INVENTION

In the handling of particulate bulk material, there are numerous ways for conveying such material and feeding it over an open end of the conveyor to a desired point of delivery. This invention is concerned with a conveyor or feeder vibrated as a free mass, i.e., the trough or conveyor is suitably isolated from the ground so that it may be vibrated in response to an oscillating force, as distinguished from a mass which is positively connected to the exciting force, as, for example, by driving the conveyor through an arm rigidly connected to a fixed stroke eccentric drive.

Vibrating screens are in use in numerous industrial situations where the necessary separation of dust and fine particles of a given product is necessary. For example, electrical utility companies burn coal, which must be delivered to the boilers in almost powdered form and screening of the coal aggregate is necessary in very great volumes.

Conventional mechanical means operate by varying the frequency or the stroke of the feeder. An exception to mechanical means for adjusting rates of feed is in the case of an electromagnetic drive for a feeder, in which case the frequency or the voltage of the applied pulsating current applied to the electromagnetic drive is varied. However, in this type of device the vibrations per minute used are generally above 1800 cycles per minute and have relatively short strokes with the result that such feeders are limited to bulk materials of the more free-flowing type as distinguished from those which are characterized as damp or viscous.

Mechanical means may include a variable rate spring device such as an air bag interposed in the drive with the pressure in the air bag being adjustable to effect the change of spring rate, or some form of mechanical adjustment of the drive motors angularity or position relative to the pan. There have been many attempts, in vibratory feeders, to utilize some form of adjustable feed rate control using electrical phenomena, but to date none of these have been successful for a number of reasons. The electromagnetic type vibrators have high energy losses and are restricted to essentially high frequency and short stroke combinations. Low frequency, long stroke devices have been conceived that utilize adjustable frequency A.C. drives, multi-speed, and/or multi-winding A.C. motors, or adjustable voltage D.C. drives which have not met with success because of high initial cost, and the cost of maintenance due to brush wear, commutator problems and the like.

Induced conveying improves material handling in applications where different kinds of solid fuels are used to produce heat in a boiler with a vibrating stoker grate that burns it. The vibratory feeders and screens induce the fuel's movement instead of forcing it. This avoids squeezing and bunching the fuel. The Particles remain loose which facilitates more efficient burning. Some power plant boilers are fired by fuels such as coal meeting a demanding specification wherein the fuel met the designation of "steam coal" having a particle size, density, and moisture content specified for efficient combustion.

When fuel is scarce because of shortages uncleaned run-of mine (ROM) coal and the waste coals such as culm, gob, silt, or high moisture "wet" coal are burned, especially in countries having economic difficulties. The biomass fuels of bagasse, wood waste such as bark, chips, shavings, and sawdust fuel is used to fire boilers. Refuse derived fuels (RDF) which is shredded municipal waster and whole or shredded rubber tries can also be sources of fuel. Density and moisture content are difficult to control. The induced vertical flow and induced conveyance flow provided by vibrating feeders, screens, and conveyors are used because these fuels are usually obstinate to flow from storage.

Generally, a vibrating screen is fixedly mounted in a screen housing with supporting frame work. The screen housing is then supported above a fixed base by springs or rotatable arms. The screen housing is caused to vibrate by some sort of drive which shakes the housing. Some drives are fixed to the base and connected by a crank journal to the vibrating screen housing. The prior art illustration shown in FIG. 1 shows a fixed base member 102, a motor 112 and a crank journal 114 driving a vibrating screen housing 108 which is movable relative to the fixed base 102 about rotating arms 104 with damper springs 20. Other drives consist of a motor fixed to the vibrating screen housing driving eccentric weights which then cause the screen housing to vibrate. These units have inherent disadvantages such as difficulty of changing or repairing motor drives and large energy consumption.

In the vibratory industry, vibratory conveying apparatus such as vibrating feeders, vibrating conveyors, vibrating screens, vibrating heat transferring fluidized beds, attrition mills, and the like, were all powered by a well-known and popular driving method called the "Single Input" or "Brute Force" type of drive. A single pair of rotating eccentric weights is the sole source of the input power in this kind of drive. Being installed directly across from one another, a single pair of eccentric weights rotating in opposite directions vibrate the vibratory conveying apparatus with a linear or "back and forth", straight line motion. As the load carrying capability of the conveying apparatus increased over the years, the weight of the rotating eccentric weights also necessarily increased in size, and the horsepower demand of the electric motor utilized to rotate the eccentric weights increased accordingly.

When more input power is needed to move heavier loads along the length of the conveying trough, more rotating eccentric weight force and horsepower are needed. Consequently, the rotatable eccentric weights become larger and heavier and have a greater force output. Likewise, the electrical windings in the vibratory motor increase in size to produce more horsepower. This increase in eccentric weight force output and the respective vibratory motor horsepower has approached the point that the vibratory motors are presently as large as practical to manufacture or to utilize on a vibratory conveying type of apparatus.

Electric motor applications attempt to match motor torque operating characteristics with load torque characteristics. Conventional electric motor applications teach that an AC.

squirrel cage motor is not to be used for adjustable speed drive, because the load torque requirements are such that when an attempt is made to substantially alter speed through change in voltage, the motor is overloaded and will burn out, except in the case when the motor drives a fan or a pump which is used in moving a fluid, wherein the load torque requirements are consistent with the thermal capability of a squirrel cage motor.

In the present invention it is possible to use an A.C. squirrel cage motor and adjust the voltage thereon to vary the feed rate of the vibratory system is because the vibratory system is of the free mass, natural frequency type, that is, the motor exciter drive is a part of a natural frequency vibratory system and the vibratory system is isolated from ground, as distinguished from a vibratory system which is driven positively from a fixed stroke rotary eccentric member as best described by Applicant prior U.S. Pat. No. 3,251,457 for a Method and Apparatus for Driving Vibratory Devices which issued in 1965 and is incorporated by reference herein in its entirety.

As the system operates below natural frequency, the mass inertia vector is diminished, the spring effect is diminished, the damping losses are diminished, and the applied force is subdivided into a horizontal and vertical component, with the horizontal component matching the damping losses, and the vertical component acting in opposition to the spring effect. This in itself creates a mechanical impedance on the motor resulting in the stroke of the feeder being diminished, and explains why the current drawn by the motor, which is proportional to the damping losses, diminishes as one moves below natural frequency. Therefore, an AC. squirrel cage motor may be used effectively to change the speed of the motor and a natural frequency resulting in a free mass vibratory system.

Watts, volts, amperes, and stroke characteristics vary exponentially in relation to speed, and that a small change in speed causes a marked change in feed rate, current, and watts, which explains why the feed rate can be changed in this manner without burning up the motor. The load torque characteristics of the motor are being matched with the load torque demands of the vibratory mass system.

It is the objective of this invention to operate as near the peak of the curve as is possible for maximum feed and normal load conditions. As a practical matter, the spring rates are chosen for a load condition to have the system operate when the vibrating screening feeder is carrying a normal load. As voltage is reduced on the motor to move from maximum feed rate to a lesser feed rate, the frequency and' stroke are both reduced until a zero feed rate is approached.

It is contemplated that a fixed rate spring will be used for tuning the vibratory mass to the frequency of the oscillatory drive. It is possible that a variable rate spring might in some instances be used to approximate the natural frequency of the system. The control of frequency and stroke would be accomplished by dropping the voltage on the AC squirrel cage motor.

An auto-transformer has shown in prior art FIG. 19 provides a way to adjust the voltage on the AC motor. Other ways in which the voltage may be regulated is, for example, by the use of solid state type control including a gating transistor.

Another common problem with vibrating screens occurs when screens become jammed or clogged with aggregate material. This clogging slows or stops throughput causing costly shutdown for screen cleaning and unclogging. The instant invention includes a pulsing solution to dislodge contaminants from the screens.

SUMMARY OF THE INVENTION

A continuous, steady flow of the supply of the incoming bulk solid such as coal, ore, wood waste, or the like is required as feed material for optimal control and screening performance of the feeding and screening system. It is recommended that the vibrating screening feeder be installed under the outlet of a storage bin or silo or surge bin. The outlet of the steady feed source must be interfaced with the vibrating screening feeder inlet chute that connects to the feed bin. The chute typically includes a baffle of 30 to 60 degrees and preferably about 45 degrees to help convert the vertical feed flow into the inlet to a horizontal or near horizontal flow and spread across the full width of the vibrating screen feeder feed plate. The screen media is usually woven wire of perforated plate with longitudinal side clamps, flap plastic squares or any standard screen media. Three screening decks are typically used in the apparatus; however, it is contemplated that additional decks may be added. The passed unders (under sized particles) collecting pan is disposed beneath the screening plates and extends the full width and length of the screen for collecting and conveying all of the passed unders to an outlet located near to the end of the screen. The collecting pan includes an outlet for discharging the passed unders located near the end of the screens and can be full width or converging. The means for powering the vibrating screening feeder is accomplished by an AC motor rotating unbalanced eccentric weights combined with sub-resonant tuned steel coil drive springs which are attached to the end of a longitudinal counterbalanced support base which is a longitudinal structure which can be cut into sections that are bolted together if necessary. The instant invention concentrates and nests the steel drive coils in selected positions or locations connecting the screening unit to the longitudinal counterbalance support base.

A vibrating conveyor screening and feeding process for conveying materials includes a bed having an inlet end and an outlet end on which material is adapted to be conveyed in a direction. A plurality of drive springs each have a first end attached to the bed and a second end attached to a support. Each drive spring is adapted to compress and extend along a line of stroke. A plurality of stabilizers attaches to the bed, each one being more rigid in a direction transverse to the line of stroke than the stabilizer is rigid in the direction of the line of stroke. A first vibratory motor has a first rotatable eccentric weight adapted to state about a first axis. A second vibratory motor has a second rotatable eccentric weight adapted to rotate about a second axis. A third vibratory motor has a third rotatable eccentric weight adapted to rotate about a third axis. A fourth vibratory motor has a fourth eccentric weight adapted to rotate about a fourth axis. The first and second axis are located substantially in a first plane and the third and fourth axis are located substantially in a second plane. The second plane is non-coplanar with the first plane and the first and second axis are spaced apart from the third and fourth axis along the direction the material is conveyed. The eccentric weights are free-wheeling with respect to one another. The vibratory motor is adapted to operate at substantially the same operating speed and to provide an output force generally perpendicular to its axis of rotation. The rotatable eccentric weights are adapted to accumulatively synchronize with one another without being rotationally coupled to one another such that the combined resulting output force of the first pair of rotatable eccentric weights is generally parallel to the line of stroke and the combined resulting output force of the second pair of rotatable eccentric weights is generally parallel to the line of stroke. The vibratory motors operate to rotate the eccentric weights, such that the rotating eccentric weights accumulatively synchronize and accumulatively add their output forces and their respective power outputs and thereby vibrate the bed along the line of stroke at a vibration frequency. The vibratory motors operate at substantially the same selected operating speed which approaches being equal to, or is less than, the natural frequency of the drive springs which are vibrating the bed.

A novel feature of the instant invention is based on the electrical control enabling a full zero to maximum output adjustment by means of adding a standard variable frequency (VFD) combined with adjustable timers so that a vibratory stroke required screening has an automatic capability of a momentary "pulsing" to 60 hertz (or higher) for a brief time of usually 3 to 5 seconds, which generates a vigorous vibratory action "spurt" or "pulse" to the entire screening body similar to a dog shaking off water. The pulsing action is usually automatically repeated to keep the screen media clear of "pegging" or being blinded by lumps or particles stuck in the openings or to break free accumulated layers of adhesive and cohesive particles that try to stick or adhere to the surface of the screening media and the passed unders collecting pan below it.

Another novel feature of the present invention is the feedback control operation of the vibrating screening feed based upon the throughput capacity of the equipment it is feeding. For instance, if feeding a rock crusher, a standard 4 to 20 ma direct current (D.C.) signal can be used to automatically control the vibrating screening feeder's variable frequency (VFD) control of the screening feeder. The closed loop of the control circuit monitors the amps drawn by the rock crusher to control the feed rate of the vibrating screening feeder by increasing or decreasing the output of the fed from the vibrating screening feeder. Thus, the amps pulled by the equipment being fed will control the rate of feed. The variation form zero to maximum TPH output and the repeated "pulsing" of making the motor with eccentric weights to go faster and then return to a slower, steady speed is accomplished with the 3 phase alternating current (A.C.) squirrel cage motor.

Another feature facilitating processing of sticky feed material is a cross bar with water spray nozzles which can optionally be used when adhesive and cohesive bulk solids are being screened to clean the sticking particles to the screening surface of the collecting pan underneath.

Use of stainless steel or other alloys which tend to resist sticky residues are also useful to eliminate sticky residue and agglomerates. Coatings such as TEFLON may also be used to treat the surface of equipment to resist sticky residue.

The vibrating screening feeder is dust tight having a bolted top cover with quick opening view ports add to the screen body. Enclosed vertical chutes are added to the discharge end. Flexible connections also seal the inlet and the outlets.

In accordance with features of the invention, the vibration drive isolation assembly includes a longitudinally extending longitudinal counterbalance member. A plurality of drive springs are supported by the longitudinal counterbalance member. The drive springs are distributed across the width and the length of the enclosed screening unit. At least one vibratory motor or mechanism is installed on the proximate end of the longitudinal counterbalance member. A plurality of isolation springs support the longitudinal counterbalance member.

Induced conveying is accomplished by imparting a proper stroke at the needed frequency to move the load. The result is a conveying motion that is induced instead of being forced. It can be a very gentle type of movement or when necessary, a very sharp, reacting type of vibration which can be produced by using an appropriate stroke angle. A helical or elliptical stroke pattern will convey the material in a circular path resulting in a backspin on the particle. A linear stroke is the most efficient one to use for unidirectional movement which moves the material in a straight line. The vibratory action does most of the work. When vibrated, the inner particle friction of the moved material is reduced.

A particle can be vibrated and conveyed over a hard surface by means of a series of repetitive "hops". Each "hop" is a cycle. The distance hopped is directly related to the unit's stroke length and the angle at which it is applied. The "hops" per unit of time is the operating frequency which is usually expressed in "cycles per minute" or (CPM).

An alternative vibratory motor embodiment suitable as a drive means for the vibratory screening feeder utilizes a double extended shaft with eccentric weights installed on both ends of the shaft and are cumulatively considered as a single rotatable eccentric weight. Vibratory motors equipped with shaft mounted eccentric weights will be emphasized herein, but other jack shaft driven combinations can also be used such as v-belts and the like. In either instance, the pair of rotatable eccentric weights are installed on and become an integral part of the conveying assembly.

It is an object of this invention to provide a vibrating screen for separating of at least two particle sizes of aggregate in a continuous flow process.

It is an object of this invention to provide a vibrating screen for separating of at least two particle sizes of aggregate in a continuous flow process which has a low horsepower to tonnage throughput ratio as compared to other separation processes.

It is an object of this invention to provide a vibrating screen which includes a periodic cleaning and unclogging of the screens wherein the speed of the drive motors is periodically and briefly changed by a nominal amount for a short time to dislodge blockages.

It is an object of this invention to provide a vibrating screen which provides motors located in an easy to maintain location at one end of the vibrating screen unit.

It is an object of the present invention to provide an electrically controlled, a vibratory drive powered by electric motors or high frequency electromagnets that are combined with steel coil springs that are sub-resonant tuned (enabling drive springs to drive harder under loaded conditions), to provide a vibrating screen for unidirectional material movement whereby the vibratory drive is the prime mover of the material (induced conveying) as opposed to conventional vibratory feeds which depend upon the force of gravity (induced vertical flow) as the prime mover of the material.

It is an object of the present invention to convey and screen material in response to applied vibratory action via a free force vibratory input combined with subresonant tuned springs to reduce interparticle friction and stratify the material into layers by particle size.

It is an object of the present invention to utilize the principle of resonance or natural frequency and to subresonant tune the drive springs to produce more under load whereby the machine' operating frequency is always kept below or under the resonant point of all the drive springs.

It is an object of the present invention to provide a vibratory feeder and screen apparatus whereby the dynamic acceleration is the same in both directions of the back and forth movement of its vibratory motion versus a reciprocating motion that moves forward slowly and then accelerates rapidly on its return stroke.

It is an object of the present invention to provide a vibratory feeder capable of screening wet bulk solids that are adhesive and cohesive.

It is an object of the present invention to provide a vibrating feeder and vibrating screen assembly which can tolerate variation in moisture content.

It is an object of the present invention to incorporate a drive system for a vibratory feeder and conveyor powered by one or more electric motors with input power provided by eccentric weights rotated by each motor, a linear stroke pattern, a wide range of operating frequencies, electrically adjustable output with zero to maximum output by variable voltage, with the stroke and frequency simultaneously changed, subresonant operational tuning, longitudinal counterbalanced vibratory force isolation, and capable of smooth repetitive starts and stops.

It is an object of the present invention to provide a drive system having three primary components comprising a steel coil drive spring that produces the portion of the load that opposes the vibratory motion, a plurality of flat bar stabilizers guide the motion, and the motor produces the remaining portion of the load that resists it.

It is an object of the present invention to provide an energy efficient drive system for the vibrating feeder and screen apparatus.

It is an object of the present invention to provide a screening deck for: cleaning unit pieces by removing clinging particles such as adhered sand or trimming edges; for washing by mounting rows of liquid sprays directly over the screen medium, a bulk solid or a unit piece so the liquid spray such as water, oil, surfactant, defactant, or other washing action; sizing to separate flakes and sizes; scalping to remove oversize particles; removing undersize particles; grading; de-liquefying; de-sliming by washing the clinging fines from freshly crushed lumpy materials; rinsing; de-watering; and draining.

It is an object of the present invention to include an underside pan for recollecting all the passed unders.

It is an object of the present invention to utilize conveying surfaces dynamically counterbalanced and isolated with isolation springs to reduce motor power consumption by 50 to 70 percent compared to conventional motors achieving the same performance.

It is an object of the present invention to utilize multiple small low HP motors with synchronized rotating eccentric weights in place of larger higher HP motors.

It is an object of the present invention to provide a "dust-tight" vibrating screen design.

It is an object of the present invention to provide an unidirectional induced conveying apparatus counterbalanced with isolator springs to support it.

It is another object of the present invention to provide an extremely simple and practical way to adjust frequency and stroke, in the drive for vibrating devices combined with mechanical impedances which are purposely built into the vibrating mass system.

A further objective of the invention is to provide an electric drive for vibratory equipment which lends itself to simplified remote control for changing the frequency and the stroke of the vibratory equipment.

A still further object of the invention is to make use of an A.C. squirrel cage induction motor which is well known to have rugged performance characteristics, low maintenance costs and low initial costs as compared to other electrical motors which are capable of adjustable speeds.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
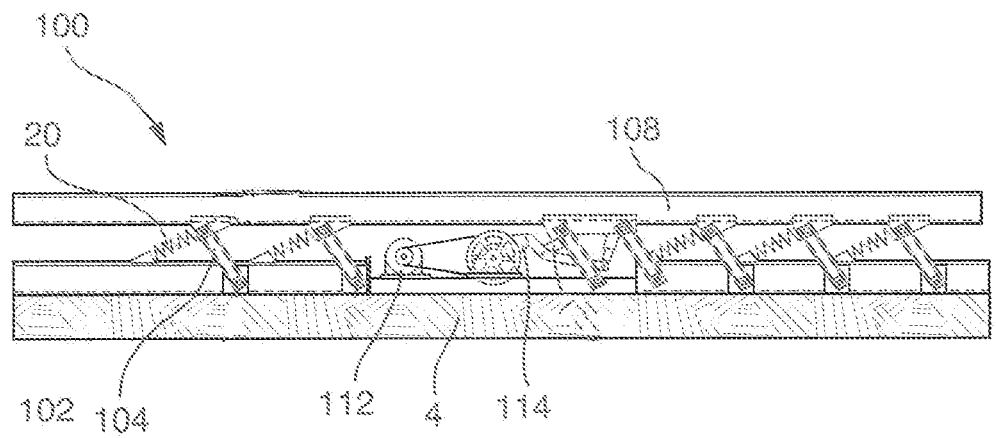
FIG. 1 is a side view of a prior art vibrating conveyor showing a fixed base member, a motor and a crank journal driving a vibrating screen housing which is movable relative to the fixed base about rotating arms with damper springs.

As shown in the FIGS. 1-17, a vibrating screening feeder system 1 includes a vibratory storage bin 8 feeding a vibrating screening feeder unit 10 feeding and crusher 70 for oversized material. The intermediate storage bin 8 is positioned above the vibrating screening feeder 10 connecting the bin outlet 102 to the feeder inlet interfacing chute 104. The size of the bin 8 is determined by the throughput to maintain a maximum feed rate to the vibratory screening feeder 10 and ensure an appropriate amount of storage to enable it to continuously operate at its rated TPH (ton per hour) capacity. The bin's outlet 102 is positioned close to the feeder inlet 103 separated by the feed plate 105. Preferably the bin 8 is a vibratory bin or hopper having the capability to shake accumulations or bridging particles from the sidewalls to effect a smooth flow of feed to the vibratory screening conveyor 10. The following U.S. Patents are incorporated by reference herein are some of the vibratory hoppers which may be useful for utilization with the present invention: U.S. Pat. Nos. 3,261,592; 3,257,040; 5,046,643; 4,960,229; 3,735,963; 4,744,893; 4,899,669; and 4,844,289.

Figure 2:
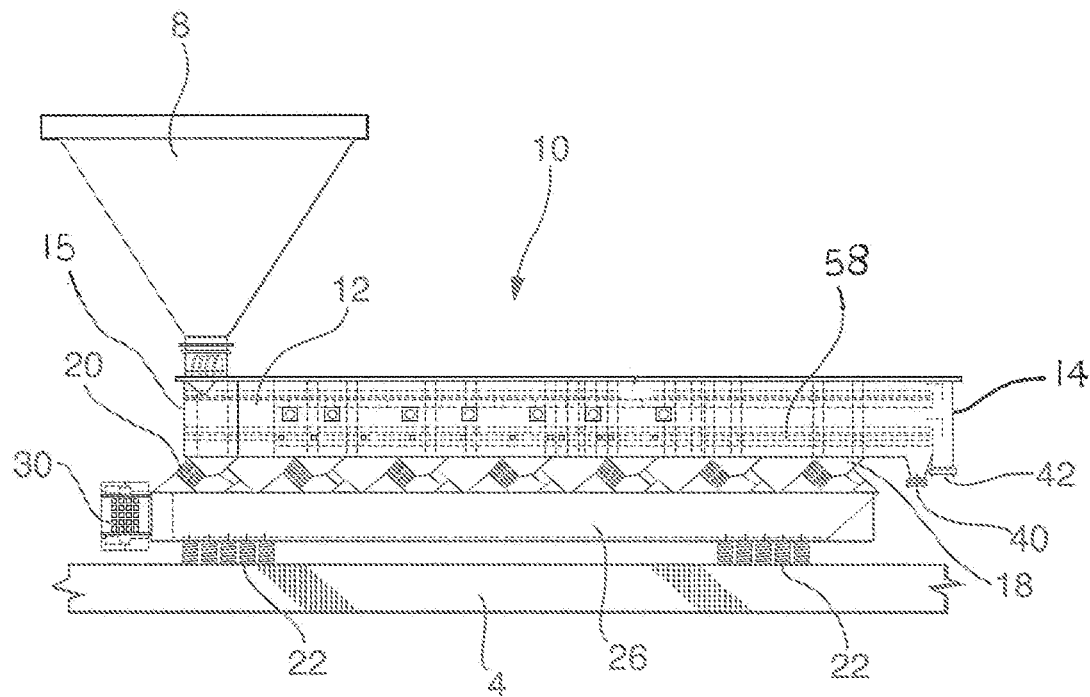
FIG. 2 is a side elevational view of the vibrating screening feeder unit illustrating natural frequency vibrating screening feeder in which the exciter motor is suspended from the vibratory mass system and acts in parallel with the drive springs which are selected to give the system natural frequency characteristics.
Figure 3:
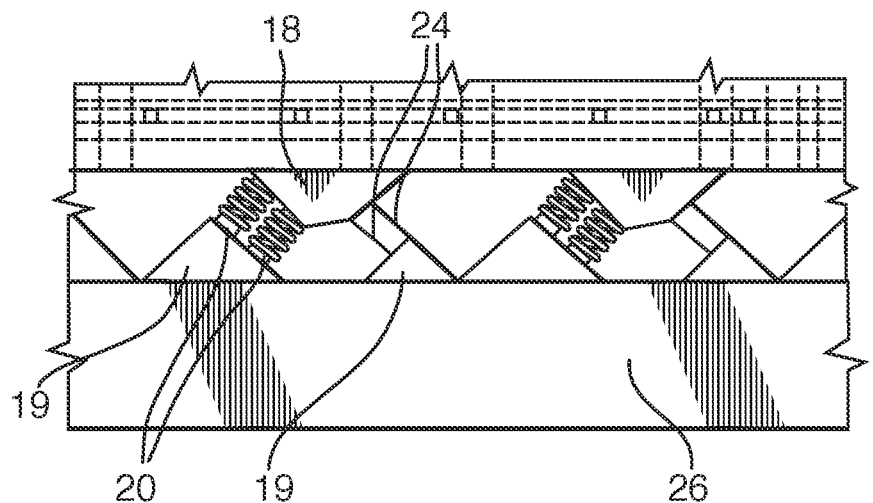
FIG. 3 is a view of a section of the vibrating screening feeder showing the screening unit connecting to drive springs mounted on brackets supported by the longitudinal counterbalance support base.
Figure 4:
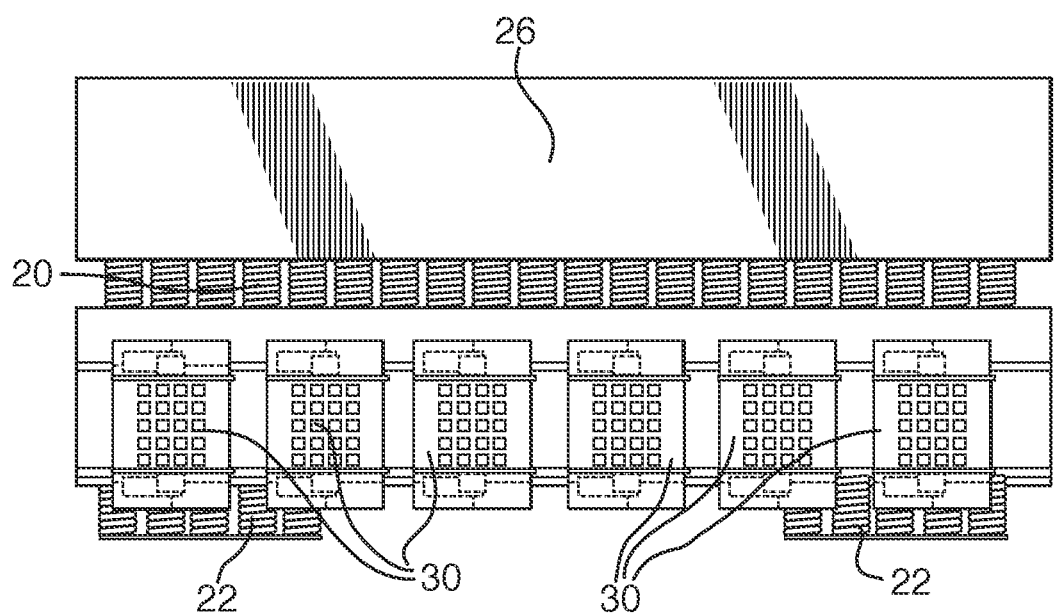
FIG. 4 is an end view of the vibrating screening feeder showing the screening unit connecting to a plurality of drive springs mounted in a row across the width of the screening unit and longitudinal counterbalance support base which is supported by a plurality of horizontal coil steel isolation springs supporting the longitudinal counterbalance support base on a base and showing a plurality of motors mounting on the end of the longitudinal counterbalance support base.
Figure 5:
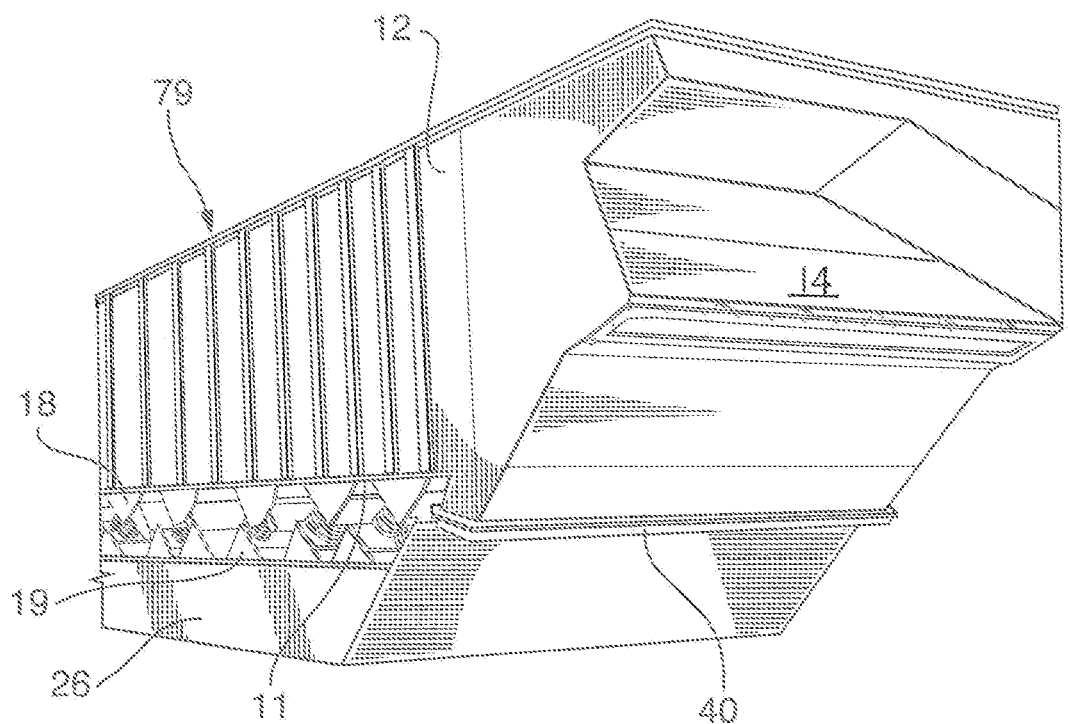
FIG. 5 is a perspective view of the vibrating screening feeder unit of the present invention showing the screening unit side walls and pan having brackets connecting to a plurality of drive springs mounted in a row across the width of the screening unit and longitudinal counterbalance support base.
Figure 6:
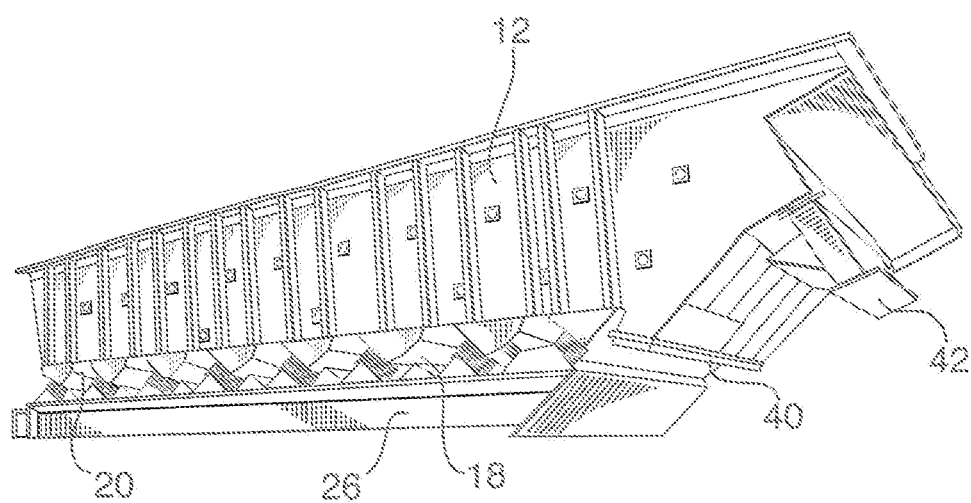
FIG. 6 is an elevated perspective view of the vibrating screening feeder unit showing the discharge chutes extending from the rear end of the present invention.
Figure 11:
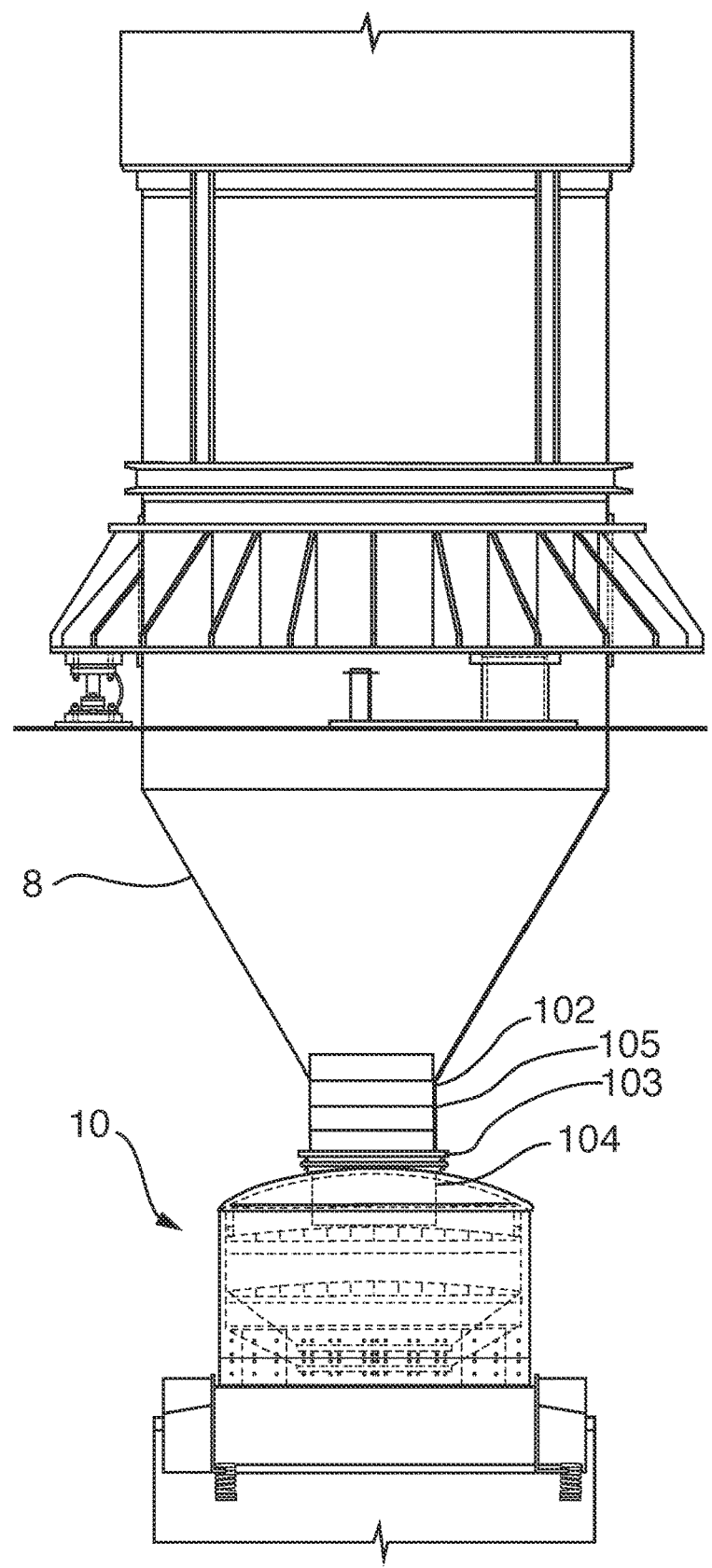
FIG. 11 is an end view of a vibrating screening feeder unit showing the storage bin positioned above the vibrating screening feeder and connecting the bin outlet to the feeder inlet interfacing chute.
Figure 12:
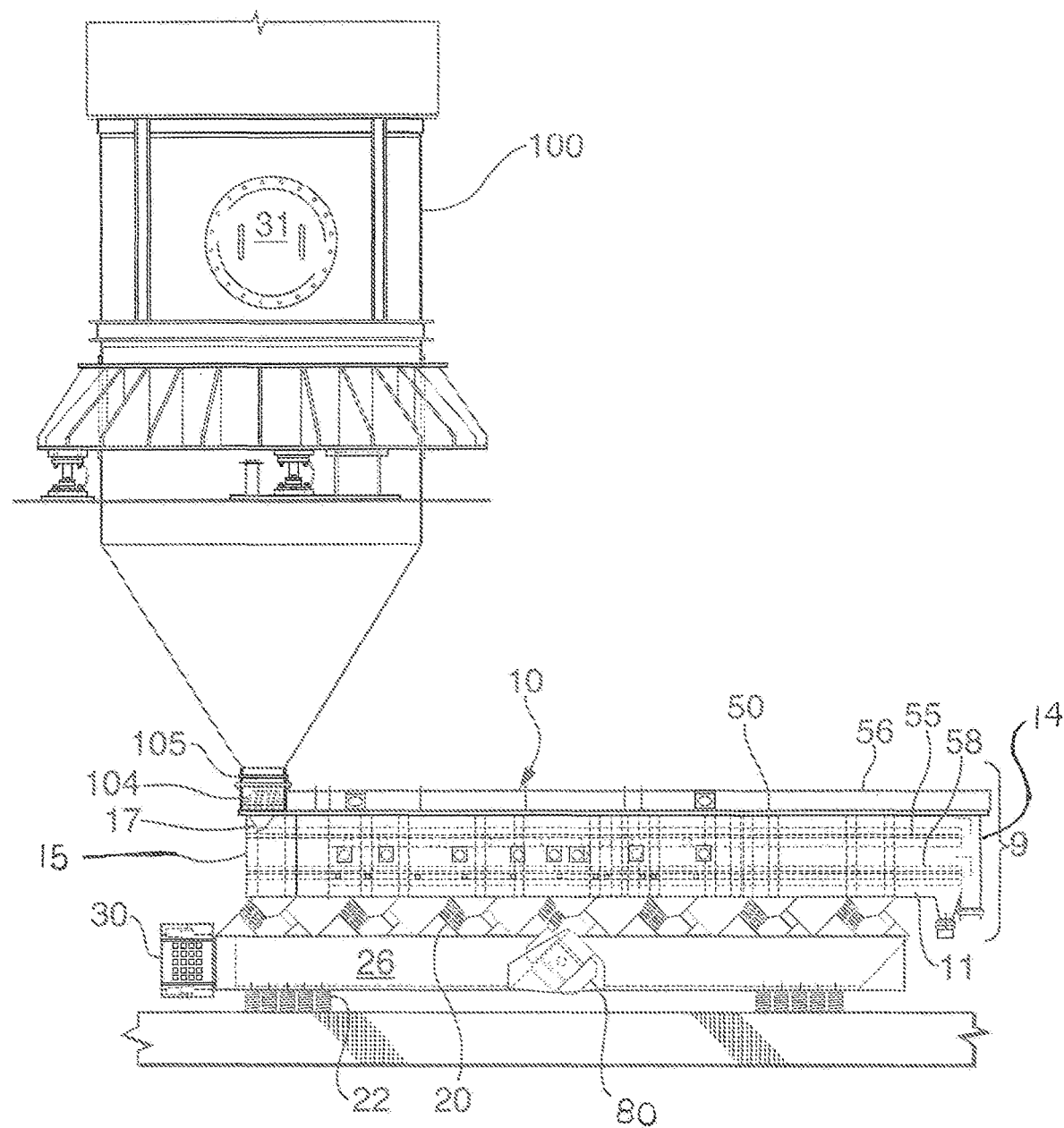
FIG. 12 is a side view of the vibratory screening feeder showing a chute connecting the bin to the feeder inlet and the screening unit supported by the longitudinal counterbalance on drive springs and the longitudinal counterbalance supported on the base with steel coil isolation springs.

As shown in FIGS. 2, and 11, a chute 104 or stove pipe can be used to connect the bin to the feeder inlet 104. On "start-up" the top section or cover is temporally removed to permit the adjustment of the "mat depth" flowing into the vibrating screening feeder 10. When adjusted properly, full width spreading is obtained and the cover 56 is reinstalled over the unit. Also shown are the horizontal coil steel isolation support springs 22 which are nested in sets and mounted to support members 23 extending across the width of the conveyor. The isolation springs 22 rest on a base, floor or other immobile support surface. A alternate motor 50 is shown mounted to the longitudinal counterbalance 26.

Figure 13:
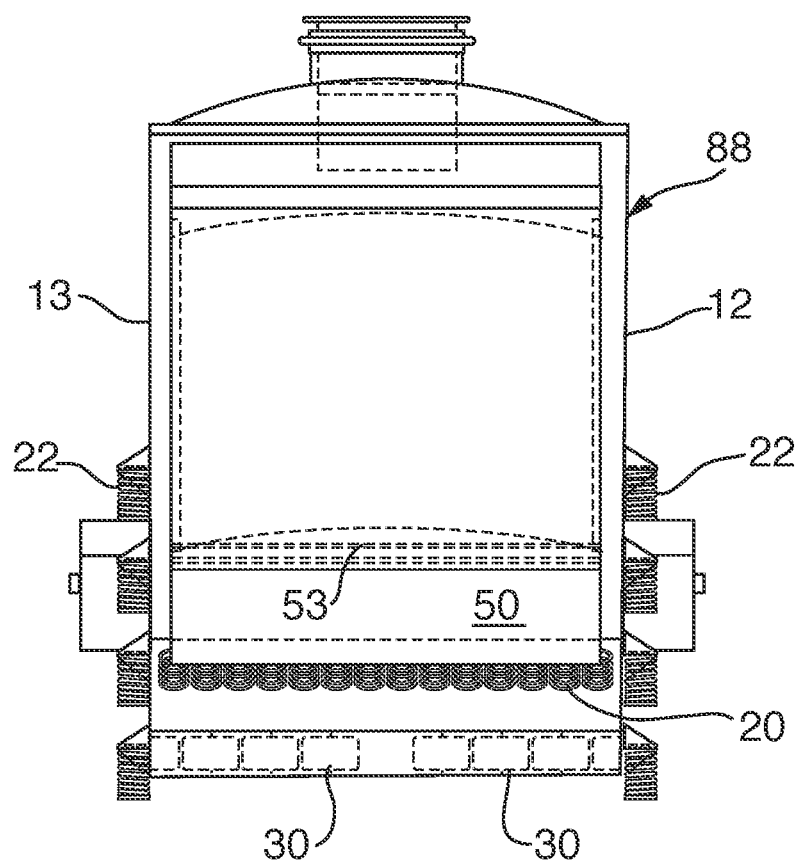
FIG. 13 is an end view of the vibrating screening feeder showing the motors attaching to the end of the longitudinal counterbalance, a row of isolation springs supporting the screening unit above the longitudinal counterbalance and the drive springs on the outside of the row extending across the screening unit supported by the longitudinal counterbalance.

FIG. 13 is an end view of the vibrating screening feeder showing the motors attaching to the end of the longitudinal counterbalance, a row of isolation springs 22 supporting the screening unit above the longitudinal counterbalance and the drive springs 20 on the outside of the row extending across the screening unit supported by the longitudinal counterbalance. The vibrating screening feeder 10 shown includes 200 drive springs 20 are arranged in sets of two rows each extending across the width of the conveyor attaching to the conveyor bed frame or integral body/frame support members 18 supported at a 45 degree angle by brackets 19 mounted on the top of the longitudinal counterbalance support base 26. Each drive spring or coil is equivalent to ½ HP. Thus, 200 drive springs provide the equivalent of 100 HP of driving force to the vibrating screening feeder 10.

Figure 14:
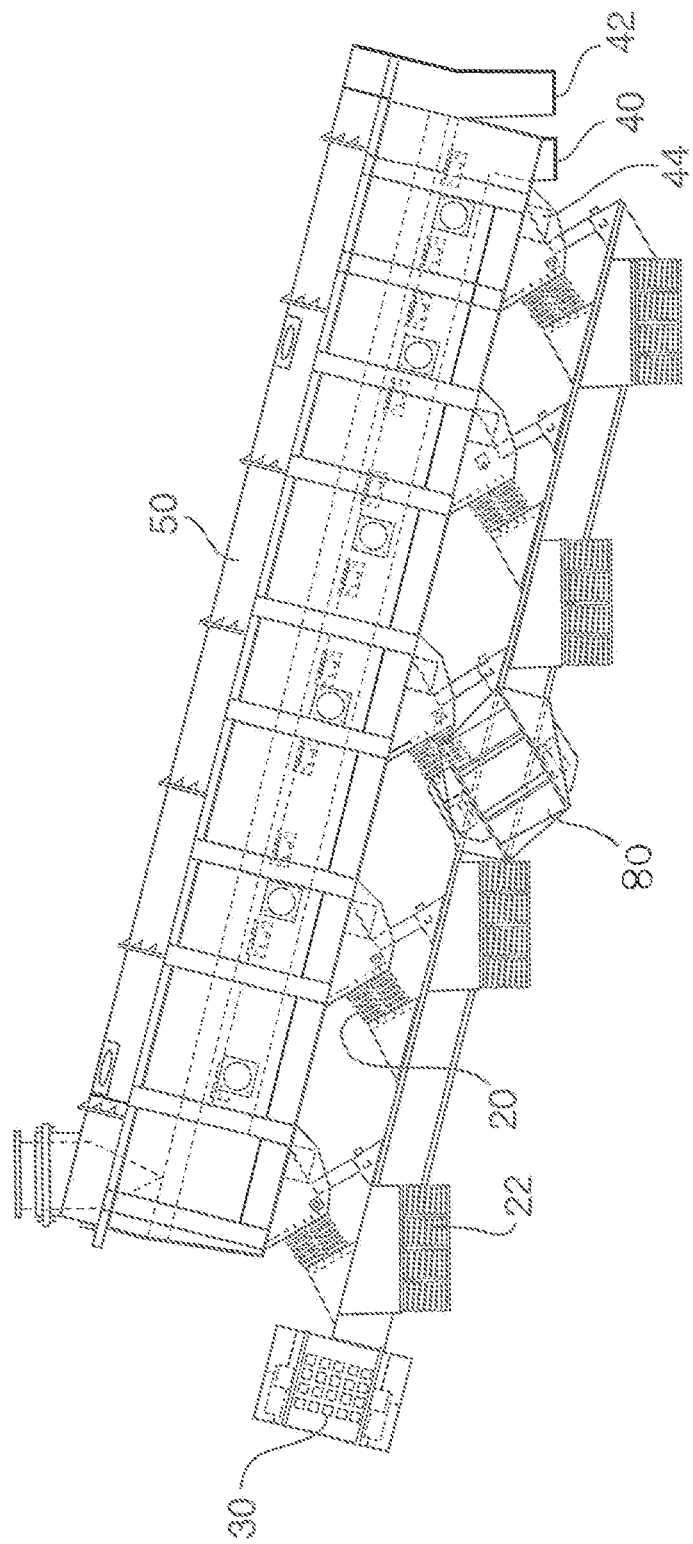
FIG. 14 is an elevated side view of the vibratory screening feeder showing a chute connecting the bin to the feeder inlet and the screening unit supported by the longitudinal counterbalance on drive springs and the longitudinal counterbalance supported on the base with steel coil isolation springs wherein the longitudinal counterbalance is angled downward at a 15 degree angle with respect to the base.

As shown in FIG. 14, the vibratory screening feeder shows a chute connecting the bin to the feeder inlet and the screening unit supported by the longitudinal counterbalance on drive springs and the longitudinal counterbalance supported on the base with steel coil isolation springs wherein the longitudinal counterbalance is angled downward at a 15 degree angle with respect to the base.

Figure 15:
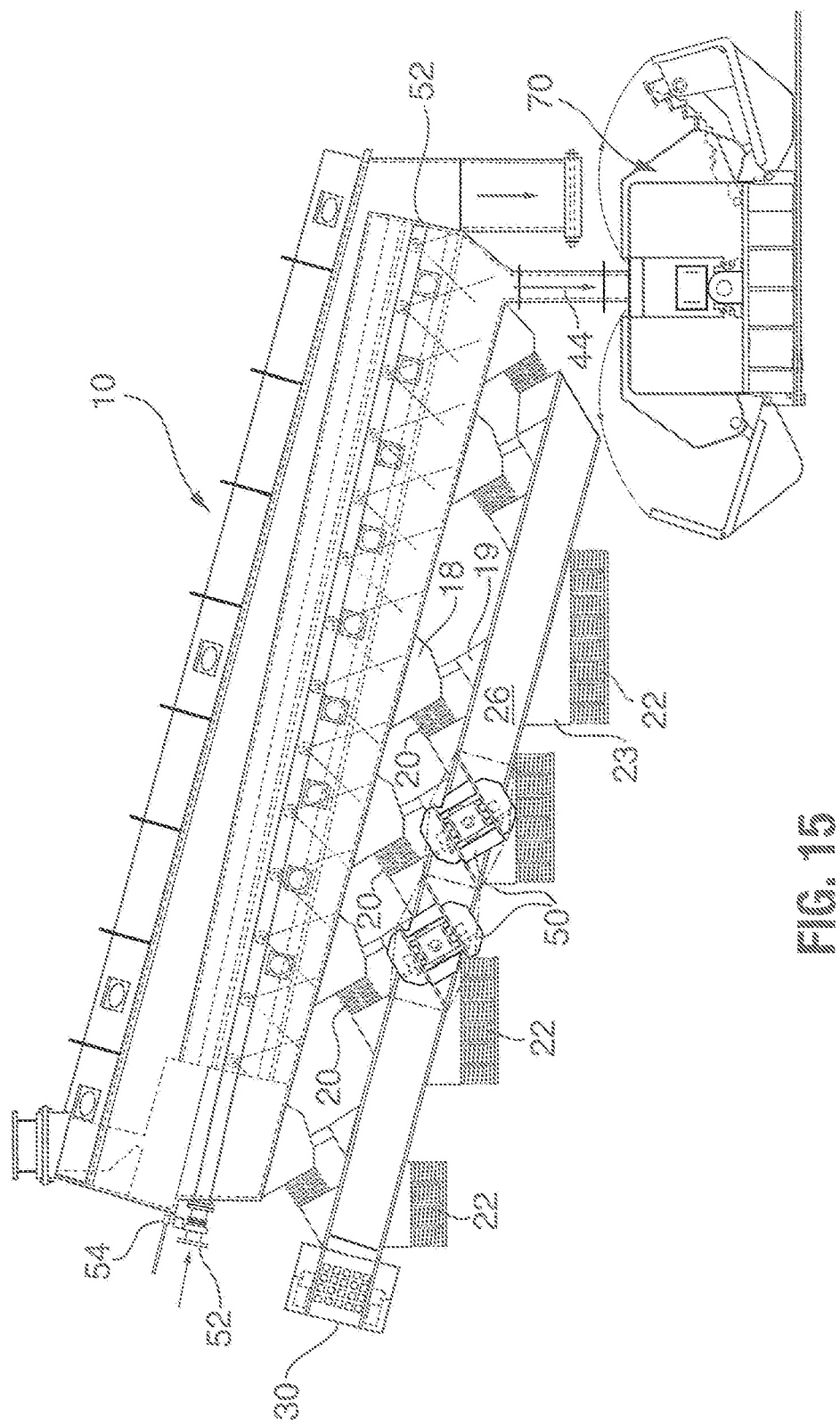
FIG. 15 is an elevated side view of the vibratory screening feeder of FIG. 16 showing a chute connecting the bin to the feeder inlet and the screening unit supported by the longitudinal counterbalance on drive springs and the longitudinal counterbalance supported on the base with steel coil isolation springs wherein the longitudinal counterbalance is angled downward at a 15 degree angle with respect to the base and showing the optional water spray bars and discharge connection to a crusher.
Figure 16:
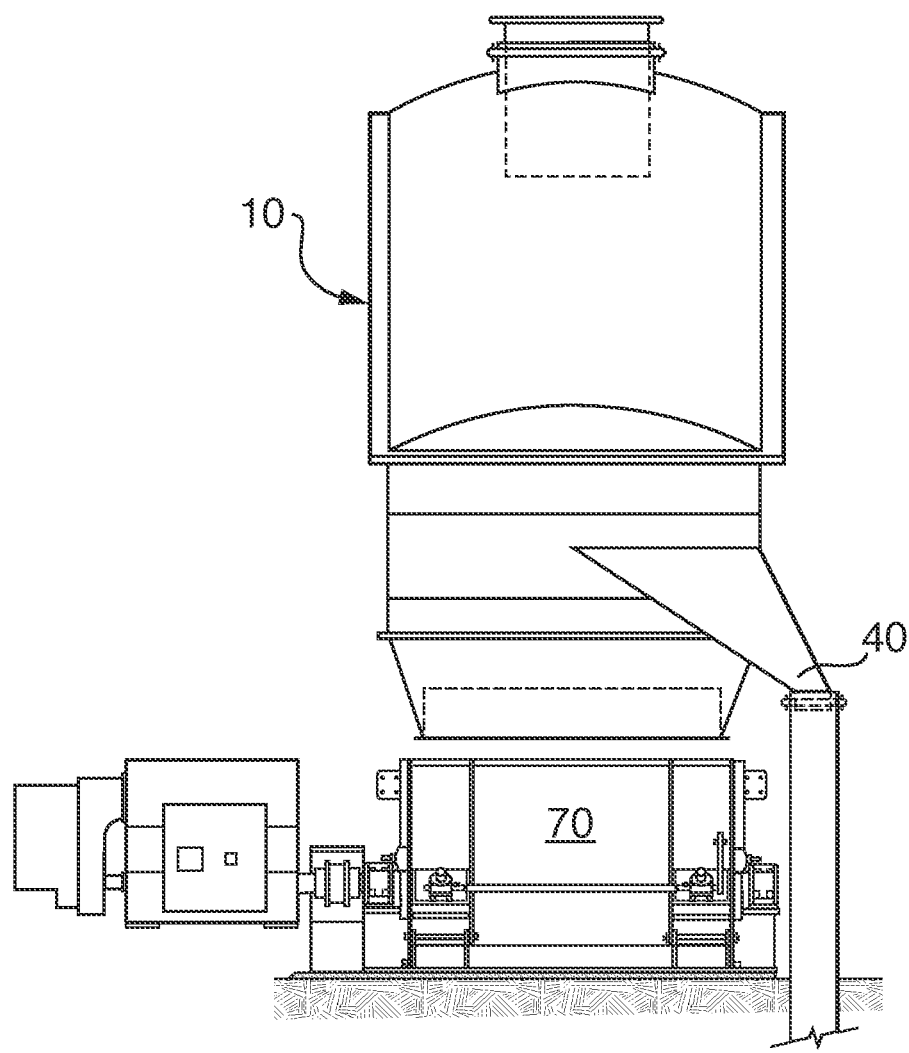
FIG. 16 is an end view showing the connection of the vibrating screening feeder to the crusher and the discharge chute.

FIG. 15 is an elevated side view of the vibratory screening feeder of FIG. 14 showing a chute 104 connecting the bin 8 to the feeder inlet and the screening unit 10 supported by the longitudinal counterbalance on drive springs 20 and the longitudinal counterbalance supported on the base with steel coil isolation springs 22 wherein the longitudinal counterbalance is angled downward at a 15 degree angle with respect to the base and showing the optional 450 gallon per minute (GPM) water spray bars 52 and valve 54 and discharge connection 44 to a crusher 70 for minus 7 millimeter material. FIG. 16 is an end view showing the connection of the vibrating screening feeder to the crusher 70 and the discharge chute 44.

The vibrating screening feeder 10 consists or comprises a trough or pan defined by a bottom floor 11, side walls 12 and 13, and a rear end wall 14, with the forward end wall 15 including chutes 40, 42, and 44 in fluid engagement with downstream processing equipment. The processed feed material is delivered to a desired conveyor or process equipment point at some selected rate of speed. The vibrating screening unit 10 is mounted on support members 18 which are carried at selected points at the front and rear portions of the a vibrating screening feeder 10 mounted beneath the trough, bed, or pan 11.

The drive springs 20 are preferably selected with K factors, that is, spring rates which are appropriately related to the frequency of the motor drive, the mass of the motor drive component, and the total mass of the driven vibratory system, so that under normal synchronous speed of the drive motor, the springs 20 will be at or near natural frequency with the system. For ideal operation, the vibratory system with its exciter drive is designed to operate at, as close to, the natural frequency of the system as illustrated by the stroke-frequency curve of FIG. 7 of U.S. Pat. No. 4,015,705 wherein the natural frequency is at the peak of the curve.

It will be understood that the drive springs 20 are also designed so that lateral forces transverse to the longitudinal axis of the vibrating screening feeder 10 are absorbed by the lateral deflections of the springs 20. Of course, if desired dual motors having the same characteristics as the motor 30, except for being each one-half the horsepower of the single motor, may be used in place of the single motor 30, in which case they are driven in opposite directions and have their motor housings rigidly joined together in a manner well known in the art so as to cause the rotating weights to phase together and cancel out the lateral forces while producing a resultant linear stroke.

A motor 30 for vibrating the vibrating screening feeder 10 at a selected frequency and stroke for moving particulate material on the pan 11 toward the discharge end 14 of the feeder. The motor drive in the present invention is capable of adjusting the rate of feed by varying the frequency and the stroke of the vibratory system.

An unexpected surprising and unique relationship exists between the characteristics of the vibratory system and the driving motor, whereby it is possible to vary not only the frequency, but also to simultaneously vary the stroke of a natural frequency vibrating feeder or similar vibratory system merely by changing the voltage on the A.C. motor 30. An A.C. squirrel cage motor has always been thought of as essentially a constant speed motor (except, of course, a multi speed or multi-winding A.C. motor) one which could not have its speed effectively varied by voltage control. The variable load requirements of a free mass, natural frequency, vibratory system in relation to speed are similar to those of a fan or a fluid pump and that it is possible to use variations in the voltage applied to the A.C. squirrel cage motor as an effective means for controlling the feeding rate of this type of vibratory system, and that, surprisingly, this can be accomplished without motor overload.

The ability to control feeder rate merely by voltage control lends itself to the remote control of systems of this type, and is far more convenient than attempting to adjust or vary the rate of the force-transmitting spring units interposed between the motor 30 and the vibrating screening feeder 10.

The motor drive 30 comprises a single alternating current squirrel cage induction motor which is supported on the end of the longitudinal counterbalance 26 from a motor mount bracket rigidly secured thereto. The motor has a squirrel cage rotor, and is thereby characterized as one which does not have brushes. For convenience the type of A.C. motor will hereinafter be referred to simply, as an A.C. squirrel cage motor, and is to be distinguished from a variable speed A.C. motor having multiple windings or multipoles for speed control.

Figure 9:
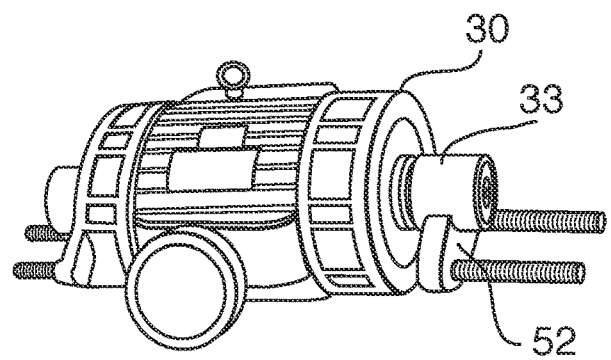
FIG. 9 shows a vibratory motor with rotatable eccentric weights.
Figure 10:
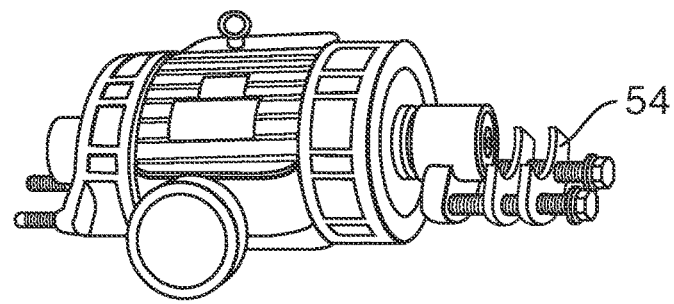
FIG. 10 shows the vibratory motor of FIG. 9 including extra weights added to the shaft.

As shown best in FIGS. 9-10, at each end of the shaft 33 of the motor 30 an eccentric weight 52 is mounted, and usually these weights are fixed to the shaft in parallel relationship, although in some instances, it may be desirable to vary their angular relative positions to achieve adjustment of the effective eccentric mass operating on the vibratory system, or adjusting weights 54 may be added to or subtracted from the eccentric weights, as required. Shrouds cover the ends of the motor to protect personnel from the revolving eccentric masses.

The motor 30 is supported on the longitudinal counterbalance in such a manner that the exciting oscillatory force supplied by the eccentrically weighted motors is applied to the vibratory conveyor screening unit 9 along a fixed angle of attack. This angle of attack is ordinarily on the order of from 20 to 40 degrees, and it will be seen that as an oscillating force is applied to the vibrating screen 9 along this axis, the particulate on the vibrating screen 9 is caused to move toward the open end of the vibrating screen 9 by what might be termed a hopping action. As the frequency of the oscillating force is reduced and/or as the stroke is reduced, the rate of feed is correspondingly reduced and it is desirable to have this rate of feed variable between zero, or substantially zero, and the maximum rate of feed.

Figure 17:
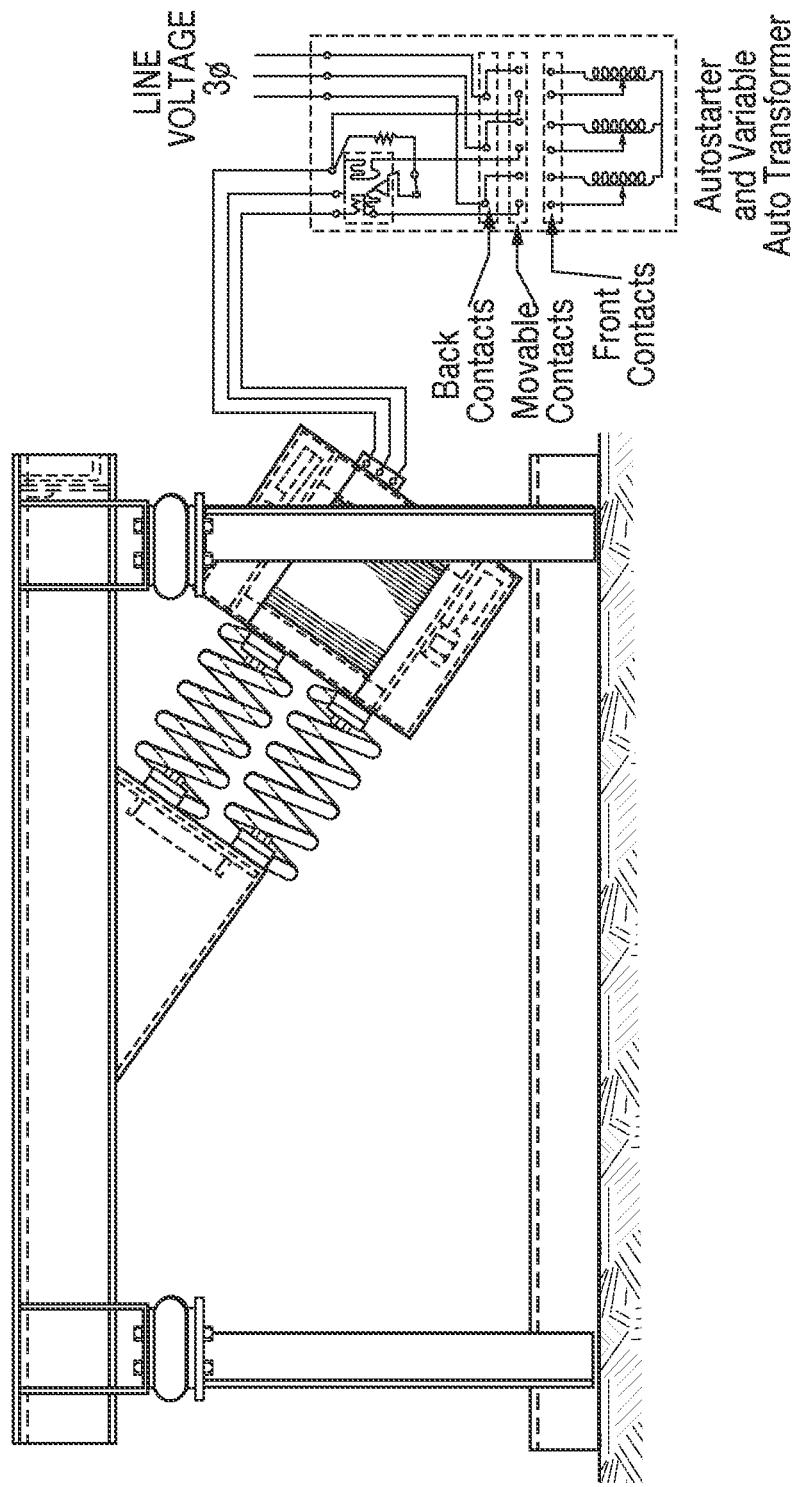
FIG. 17 is a side elevational view showing the drive of this invention applied to a natural frequency vibratory feeder where the springs are in series with the motor drive.

It is an accepted fact in the natural frequency vibrating system field (as for example in the type of feeder shown in Klemencik U.S. Pat. No. 2,725,984) that one can normally determine whether the system is operating in natural frequency by checking the current draw on the motor, because, when the system is operating at true natural frequency, the current draw is at a minimum. Conversely, to the extent that a system of this type is not operating at natural frequency, the power requirements go up, and this is reflected in increased current draw, regardless of whether one is operating above or below the point of natural frequency. Contrary to conventional teachings, when the present invention is operating in natural frequency, the current drawn by the motor is at its maximum, and, as the frequency (i.e. speed) of the motor is changed by dropping the voltage, the current decreases. As one moves below natural frequency with the system the current going through the motor drops rather than rises, as might normally be expected. It is possible to effectively vary the feed rate of a vibratory conveying or feeding system from-substantially zero to its maximum feed rate, merely by adjusting the voltage of an A.C. squirrel cage motor. This of course can conveniently be done with an auto transformer, such as shown in FIG. 17.

The vibrating screening feeder is adapted to be driven by a plurality of accumulatively phased pairs of free-wheeling rotatable eccentric weights. The accumulative force output produced by the rotating eccentric weights will be a unified amount equal to the sum of all the multiple pairs of eccentric weights. The respective power outputs of the motors turning these eccentric weights will also accumulatively add. This wanted "phasing" of multiple pairs of rotating eccentric weights will only occur when used in conjunction with properly stabilized, sub-resonant tuned, stiff drive springs.

The accumulative phasing of a plurality of pairs of rotating eccentric weights is applicable to vibratory conveyors of the non-balanced type, which must be rigidly fixed to their support structure. It is also applicable to vibratory conveying machines that are dynamically counterbalanced and provided with isolation springs. The longitudinal counterbalance can be one single longitudinal assembly, or the longitudinal counterbalance can be sectionalized in a plurality of sections as shown in Dumbaugh U.S. Pat. No. 4,149,627. It is important to note the vibrating screen 9 must employ the sub-resonant tuned springs kind of vibratory drive configuration that is properly stabilized for this wanted multiple phasing of a plurality of pairs of rotatable eccentric weights to occur.

The multiple pairs of rotatable eccentric weights are installed on and become an integral part of the conveying trough assembly of the conveying apparatus when the vibratory conveying apparatus is the "non-balanced" type. This means its longitudinal counterbalance frame is rigidly "fixed" to a robust stationary foundation. Conversely, when the vibratory conveyor is "dynamically counterbalanced", the pair of rotatable eccentric weights can be installed on either the conveying trough or on a counterbalancing member. When the conveying apparatus is longitudinal counterbalanced, the pair of rotatable eccentric weights are almost always installed on the counterbalancing member.

Method of Use:

A continuous, steady flow of the supply of the incoming bulk solid such as coal, ore, wood waste, or the like is required as feed material for optimal control and screening performance of the feeding and screening system. It is recommended that the vibrating screening feeder 10 be installed under the outlet of a storage bin or silo or surge bin 8. The outlet 102 of the steady feed source must be interfaced with the vibrating screening feeder inlet chute 104 that connects to the feed bin 8. The chute typically includes a baffle of 30 to 60 degrees and preferably about 45 degrees to help convert the vertical feed flow into the inlet to a horizontal or near horizontal flow and spread across the full width of the vibrating screen feeder feed plate 17.

The screen media 53 is usually woven wire or a perforated plate with longitudinal side clamps, flap plastic squares or any standard screen media. Three screening decks, a (top deck 50, a middle deck 55, and a bottom deck 58), and a bottom trough or pan 11 are typically used in the vibrating screening feeder 10; however, it is contemplated that additional decks may be added. The passed "unders" (under sized particles) collecting pan 11 is disposed beneath the screening plates and extends the full width and length of the screen for collecting and conveying all of the passed "unders" to an outlet located near to the end of the screen. The collecting pan 11 includes an outlet 44 for discharging the "passed unders" located near the end of the screens and can be full width or converging. The means for powering the vibrating screening feeder is accomplished by motorized an AC motor rotating unbalanced eccentric weights combined with sub-resonant tuned steel coil drive springs which are attached to the end of a counterbalanced support base which is a longitudinal structure which can be cut into sections that are bolted together if necessary. The instant invention concentrates and nests the steel drive coils 20 in rows at selected positions or locations connecting the screening unit to the longitudinal counterbalance support base 26.

The electrical control enables a full zero to maximum output adjustment by means of adding a standard variable frequency (VFD) combined with adjustable timers so that a vibratory stroke of about 2 Gees for the require screening (50 Hz at for about 25 seconds) has an automatic capability of a momentary "pulsing" to (60 hertz (or higher) for a brief time of usually 3 to 5 seconds), which generates a ver vigorous vibratory action "spurt" or "pulse" to the entire screening body similar to a dog shaking off water. The novel pulsing action is usually automatically repeated to keep the screen media clear of "pegging" or being blinded by lumps or particles) stuck in the openings) or to break free accumulated layers of adhesive and cohesive particles that try to "stick" or adhere to the surface of the screening media and the passed "unders" collecting pan 11 below it.

A novel feature of the present invention is the control of the vibrating screening feed by the equipment it is feeding. For instance, if feeding a rock crusher 70, a standard 4 to 20 ma D.C. signal automatically controls the vibrating screening feeder's variable frequency (VFD) control of the vibrating screening feeder 10. The closed loop of the control circuit comprises or consists of monitoring the amps drawn by the rock crusher to control the feed rate of the vibrating screening feeder by increasing or decreasing the output of the fed from the vibrating screen. Thus, the amps pulled by the equipment being fed will control the rate of feed. The variation form zero to maximum TPH output and the repeated "pulsing" of making the motor with eccentric weights to go faster and then return to a slower, steady speed is accomplished with the 3 phase A.C. squirrel cage motor.

More particularly, there is provided a vibrating screen unit 9 comprising, consisting of, or consisting essentially of a generally rectangular vibrating screen housing 79 supported by a fixed base 4 defining a longitudinal counterbalance 26 by a plurality of upward extending isolation support coil springs 22 fixedly attaching to a top surface of the longitudinal counterbalance 26 and fixedly attached to a bottom surface of the generally rectangular frame 8. The intermediate frame 8 has triangular shaped support members 18 defining alternating large and small triangular abutments extending upward therefrom. The large triangular abutments have a first side forming about a forty-five degree angle with a top surface of the longitudinal counterbalance 26. The first side of the large triangular abutment 18 have a drive coil spring 20 extending upward therefrom at about a forty-five degree angle with a top surface of the longitudinal counterbalance 26. The small triangular abutment has two spaced apart leaf spring rockers 24 extending upward at about a forty-five degree angle with the top surface of the longitudinal counterbalance 26. The first side of the large abutment faces toward the second side of the small abutment. A generally rectangular vibrating screen housing 79 has at least two rows of downward extending trapezoidal abutments on a bottom surface thereof. The trapezoidal abutments fixedly connect on a third side to free ends of the upward extending drive coils 20 and on a fourth side to free ends of the upward extending leaf springs. The vibrating screen housing 79 has at least one screen and preferably a plurality of screens extending the width and length thereof and at least two output apertures formed therein. The longitudinal counterbalance support base 26 has a plurality of motors 30 mounted at a front end 15 thereof. The motors have output shafts extending from top and bottom ends with eccentric weights mounted on the shafts in mechanical time with one another. A programmable motor control unit is capable of driving the motors with the weights synchronized with one another and capable of driving the motors at a selected speed and of periodically changing the speed for a selected time interval by a selected amount.

The present application provides a vibrating screen for separating different sizes of aggregate in a continuous flow process wherein aggregate flows into a hopper, down onto one end of a vibrating screen, and is transported over the screen by vibration of the screen. Fine and medium sized portions of the aggregate fall through the first screen to a second screen. Only fine portions fall through the second screen. Thus the aggregate is separated into three grades of material. The vibrating screen is rotatably connected to a moveable intermediate base member by a plurality of leaf springs fixedly connected at about a forty-five degree angle between the longitudinal counterbalance 26 and the vibrating screen frame unit 9 and a plurality of coil springs called 'drive springs' 20 which are connected at 45 degrees with the leaf springs between the longitudinal counterbalance and the vibrating screen. The longitudinal counterbalance in turn is supported above a fixed base member by vertical coil springs 22. The longitudinal counterbalance includes a number of electric motors 30 which have eccentric weights connected directly to the shafts. When the motors are running the spinning eccentric weights cause the vibrating screening frame 10 to vibrate at a frequency consistent with the speed of the motors. The speed of the motors can be varied to give a different vibrating frequency.

The mostly horizontal left and right motion of the intermediate base member therefore causes a left to right and an up and down motion of the vibrating screen housing 79. It can also be seen that, primarily, the 'drive springs' 20, and to a smaller degree, both the leaf springs 24 and the drive springs 20, store and release energy every cycle of movement. This system of springs establishes a harmonic system which tries to maintain a frequency of movement of the system. This storing and releasing of energy allows for a more efficient system with fewer and smaller drive motors for a given throughput of aggregate.

The motors 30 are variable speed and run at one selected speed most of the time. Periodically, however, the speed is changed by a selected amount for a selected period of time and then returned to normal. This change in speed dislodges jams or clogs that occasionally occur in the process, due to density and particle variance, moisture, and so forth. The vibrating screen of the present invention gives superior performance where moist aggregate is an issue.

A programmable motor controller easily accomplishes this periodic cycle of motor speed change. A user can easily change the cleaning cycle time and amount of speed change, as desired.

The preferred embodiment includes an input hopper 100 with a vibratory motor 31 to vibrate the provide consistent feed rate of aggregate onto the vibrating screens. Another preferred embodiment has a hopper without a separate vibratory drive motor and wherein the gap between the bottom of the hopper is adjusted manually to give an ideal flow of aggregate over the input end of the vibrating screen. This hopper is preferably fitted with a device which strikes the side of the hopper periodically or whenever a bridging or clogging of aggregate is detected.

It is anticipated that a feed box may be used between the hopper and the vibratory screen comprising a short length conveying trough utilized at the inlet end of the conveyor where the incoming bulk solid needs to be stratified to avoid abrasive wear from impacting and the unnecessary blinding of the screen medium on its upstream extremity. The feed to the screening unit needs to be uniform and with a reasonable spread across its width.

Referring now to the drawings, the vibration drive isolation system or assembly is arranged to minimize vibration to exterior plant equipment. Vibration drive isolation system includes a longitudinal counterbalance member 26, a plurality of drive springs 20 supported by longitudinal counterbalance member 26 and a plurality of isolation springs 22 supporting the longitudinal counterbalance member 26. A structural steel base 4 supports the isolation springs 22. The vibration unit has a variable speed motor control capable for adjusting the vibration intensity.

Both the time between oscillations and the intensity of the oscillation can be controlled with an easy control panel adjustment of controller. They require no mechanical adjustment of eccentrics.

Figure 7:
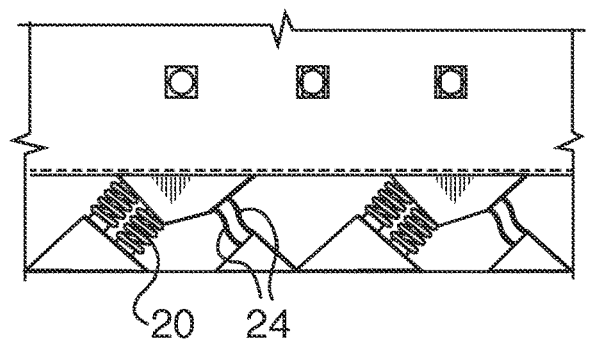
FIG. 7 shows that when the drive springs 20 are expanded, the rocker springs 24 are flexed upward.
Figure 8:
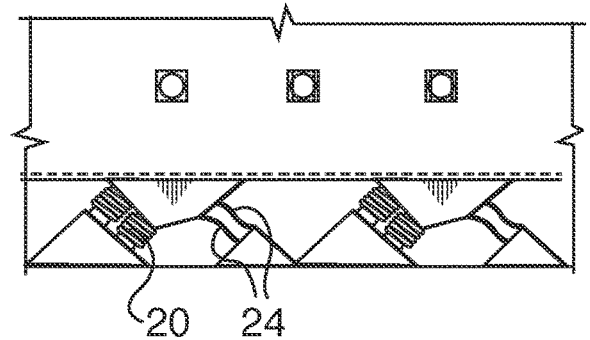
FIG. 8 shows that when the drive springs are compressed, the rocker springs 24 are flexed downward.

The electric motors 30 of the vibratory drive assembly are attached to the dynamic counter-balance 26 and positioned at the front end 15 or under the combination of the steel coil drive springs 20 and multiple flat bar type of stabilizers. The assembly is supported from the longitudinal counter-balance 26 by the appropriately spaced isolating springs 22 mounted in compression and appropriately spaced along its length. The vibratory motors with shaft mounted eccentric weights 80 are either installed on each side of the counter-balance 26 as shown in FIG. 7, or combined together, and placed at the front end 15 of the counter-balance.

The steel coil type drive springs 20 are distributed across the width and along the length of the underside of the screen unit 9. The drive springs 20 are combined with flat bar type stabilizers 24 to assure a uniform stroking action. The flat bar type stabilizers 24 are used to guide the movement of the stiff drive springs 20.

The drive springs 20 are sub-resonant tuned to cause them to inherently work harder under load, where sub means under and Resonant means natural frequency. Therefore, "Sub-resonant" means the maximum running speed of the vibratory motors 30 is always under the natural frequency of the combined drive springs. For example, if the top motor speed is 570 RPM, which in this instance is the same as CPM, then the natural frequency of all the drive springs 182 would be, for example, 620 CPM. While 570 CPM is preferred, other frequencies such as 720 CPM, 900 CPM or 1200 CPM, might be useful for various applications.

The axial centerline of the steel coil drive springs 20 is provided in line with the wanted stroke angle, but the axial centerline of the stabilizer 24 is perpendicular to the stroke angle. By utilizing paralleled counter-balance 26 as a longitudinal configuration, the enclosed vibrating screening feeder 10 is dynamically counter-balanced. The structural Natural Frequency of the counter-balance assembly will be at least 1.4 times the maximum speed of the motors, but preferably will exceed it. In this instance, the RPM of the motor 30 is the same as the vibrating CPM of the enclosed vibrating screening feeder 10.

Relatively soft steel coil type isolation springs 22 are used to support the longitudinal counter-balance 26 which in turn supports the enclosed vibrating screening unit 9 above it. Preferable needed input power is proved by three phase, A-C squirrel cage vibratory motors 30. Electrical adjustment of conveying speed is provided by the controller implements either as a variable voltage or an adjustable frequency type of electrical control. The conveying speed of the ash over the vibrating screening feeder 10 can be electrically adjusted.

In operation, the vibratory motor(s) 30 are energized and the shaft mounted eccentric weights are accelerated to full speed. The force output of the rotating eccentric weights excites or induces all the stiff steel coil drive springs 20 and flat bar stabilizers 24 to vibrate back and forth in a straight line. The speed (RPM) of the vibratory motors 30 is the same as the vibrating frequency (CPM) of the drive springs 20. This happens even though the natural frequency of the drive springs 20 is above the motor speed. Consequently, the enclosed vibrating screening feeder 10 vibrates at a prescribed amount of linear stroke at the wanted angle, which is usually 45 degrees. As an equal reaction to the vibratory movement of feeder 10, the counter-balance member 26 inherently moves in an opposite direction. Thus, the opposing dynamic forces cancel one another. The counter-balance 26 freely moves or floats on top the soft isolation springs 22 supporting it.

A resulting directional, straight line stroke on the enclosed unit induces the particles to unidirectional move forward simultaneously over the screens and pan. This particle movement is the result of a series of hops or pitches and catches by the applied vibration. Normally, the particles first settles on screen. Then, it is gradually moved forward by repetitive on and off cycles of applied vibration. For example, the particles are moved 3 feet every 6 minutes. Alternatively, the particle movement over the screen surfaces could be electrically adjusted via adjustment of motor operation by controller to provide, for example, a conveying speed of 0.5 FPM. The particles conveyed on the screens discharges into vertical chutes. The particle sifting that fall through any openings in the screens drop onto the bottom conveying pan 11. When the vibratory conveying action is applied, these particles move forward. Eventually, these particles fall down through outlets located near the discharge end of the screening unit 9.

The vibrating screening feeder 10 includes a plurality of vibratory motors 30 placed relatively close together on the front end 15 of the longitudinal counterbalance 26. In one embodiment, a total of six vibratory motors are disposed transversely across from one another with respect to the longitudinal width of the vibrating screening feeder 10. Each vibratory motor includes a rotatable eccentric weight. Since the rotating eccentric weights are located on the top and bottom of each motor, a total of twelve individual eccentric weights would be involved, but all of the eccentric weights on a single motor are considered herein to be a single eccentric weight. The eccentric weight attached to one of the vibratory motors in a pair of vibratory motors is substantially equal in size to the eccentric weight attached to the other vibratory motor in the pair of vibratory motors. Each motor is rated 45-60 HP, which would make a total of 270-300 HP provided by the six vibratory motors although other sizes of motors can be used. While electric motors are preferred, air motors or hydraulic motors can also be used.

Each vibratory motor preferably has the substantially same size eccentric weight attached thereto, such that each vibratory motor and eccentric weight produce substantially the same force output during operation.

All six motors synchronize and provide an accumulatively phased force output equal to the sum of the individual force outputs of all of the eccentric weights. The proper phasing of the eccentric weights happens if each pair of motors is started separately, or in any combination, or all started at the same time. These motors would still try to "phase" even if the rotation was different when these six motors are working in conjunction with sub-resonant tuned steel coil drive springs that have flat bar type stabilizers to guide their stroke line.

The goal is to make the load carrying vibrating screening feeder 10 to vibrate at a prescribed stroke of, for example, one-half inch at a frequency of 570 cycles per minute (CPM), which is the same as the rotational speed of the motors at 570 revolutions per minute (RPM). In other words, the operating frequency of the conveying apparatus 10 in CPM is the same as the RPM of the motors.

After being energized at the same time all six the motors accelerate the rotatable eccentric weights installed on the top and bottom shaft extension of the motors. While the weights are accelerating, a slight "shimmy" or shudder-like movement may be present. After all six motors have reached full speed, the stroke on the conveying trough assembly begins to grow steadily from, for example, from one-eighth inch to the desired maximum of one-half inch in about twenty seconds. Thus, the three pairs of motor combinations require about ten to twenty seconds after being energized to accelerate the eccentric weights and to properly "phase" or to accumulatively synchronize the outputs of the eccentric weights.

All of the rotating eccentric weights may have exactly the same force output. If any of these motors is de-energized, then the resulting stroke on the vibrating screening feeder will decrease from its maximum amount.

The "phased" or synchronized eccentric weights on the vibratory motors excite or prompt the steel coil drive springs 20 to move back and forth, or compress and extend, in a straight line of stroke. That "line" is guided by the flat bar type stabilizers 24 installed at 90 degrees or perpendicular to the axial centerline of the steel coil drive springs 20. The vibratory screening unit 9 positioned on top of the drive spring brackets vibrates back and forth in reaction to the movement of the longitudinal counterbalance 26 below. This is in keeping with Newton's Law of an "equal and opposite reaction". Stabilization of the drive springs 20 must be relatively rigid in a direction transverse to the line of stroke and relatively weak in the direction of stroke. For example, the flat bar stabilizer 24 may be five inches wide across its transverse width and only one-eighth inch thick in the direction of the stroke. If the drive springs 20 are not rigidly stabilized in a direction transverse to the line of stroke, then the rotating eccentric weights may not synchronize. The stabilizers 24 may be formed in other configurations than as flat bars so long as the stabilizer is relatively rigid in a direction transverse to the line of stroke and relatively weak in the direction of stroke. The vibratory motors are tilted or inclined from horizontal to agree with the stroke line and the installed inclined angle of the drive springs 20.

The entire apparatus vibrates very smoothly and quietly when all six motors are up to their full speed. The amount of vibratory stroke remains constant or steady. A given amount of bulk solid, such as foundry sand, in the vibrating screening feeder installed above the longitudinal counterbalance 26 can be conveyed forward at a steady speed of, for example, approximately forty feet per minute (FPM).

In another embodiment, the stiff steel coil drive springs 20 have a combined natural frequency that is always above the maximum speed of the motors being utilized. "Sub" means "under" and "resonant" means "natural frequency". Therefore, "sub-resonant" means to maintain the top running speed of the motor (for example, 600 RPM or CPM) to always be under the "natural frequency" of all the steel coil drive springs 20 (for example, 650 CPM) when the vibratory conveyor 10 is in the "no load" state or empty condition. When a load is applied to the vibrating screening feeder the "natural frequency" of all the installed drive springs 20 will inherently reduce in response to the added weight of the load (for example, to 625 CPM). Because the natural frequency of the drive springs 20 has decreased (from 650 to 625 CPM), and moved closer to the motor speed (600 RPM or CPM), the entire drive configuration works harder. The more the natural frequency of the drive springs decreases because of additional load being added to the vibrating screening feeder, the more close the natural frequency of all the drive springs 20 comes to the running speed of the motors. Thus, the drive configuration works even harder. This is the advantage of "sub-resonant" tuning.

Consequently, the stiff steel coil drive springs 20 in combination with the six motors inherently drive harder when load is applied to the vibrating screening feeder 10. Therefore, the use of "sub-resonant" tuning takes advantage of the principal of "natural frequency". However, it should be noted this kind of drive configuration does not normally operate in "natural frequency".

The objective is to make the respective force outputs of the eccentric weights to "pull" the screens of the vibrating screening feeder 10 in tension from the discharge end as compared to "pushing" the inertial mass in compression from the inlet end. The same relationship is wanted from the total number of drive springs 20 installed that help to make the apparatus vibrate. This is the reason the collective forces from both the rotating eccentric weights and the drive springs should place the overall length of the vibratory apparatus in tension as compared to being in compression. More simply stated, the vibratory apparatus is dynamically being "pulled" instead of being "pushed".

When an electrical means for adjusting the operating stroke and frequency of the vibratory machine is wanted, it is preferred to be large enough to control the total combination of paired motors installed on the vibratory apparatus. To ensure each of those individual controllers are responding to the same electrical pilot signal (usually 4 to 20 ma D.C.) to ensure each of the motors is rotating at the same speed throughout the range of adjustment. This may be accomplished by use of a common electrical potentiometer on either the variable voltage or the frequency inverter type of electrical controls. The simultaneous adjustment of the operating stroke and frequency by means of a variable voltage electrical control as outlined in U.S. Pat. Nos. 3,251,457 and 4,015,705 can be successfully utilized. As a substitute for the variable voltage control, a frequency inverter can also be utilized.

Since these motors are combined with sub-resonant tuned drive springs 20 that are properly stabilized by stabilizers 24, the plurality of motors requires less work output to align with the movement of the stiff drive springs 20 than it would be to try to be "out of step" or not phased or accumulatively synchronized with all the sub-resonant tuned drive springs 20.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A vibrating conveyor screening and feeding process for conveying materials including the steps of:
   providing a bed having an inlet end and an outlet end on which material is adapted to be conveyed in a direction;
   providing a plurality of drive springs, each one of said plurality of drive springs having a first end attached to said bed and a second end attached to a support, each one of said plurality of drive springs adapted to compress and extend along a line of stroke;
   providing a plurality of stabilizers attached to said bed, each one of said plurality of stabilizers being more rigid in a direction transverse to said line of stroke than in a direction of said line of stroke;
   providing a plurality of vibratory motors, including a first vibratory motor having a first rotatable eccentric weight adapted to rotate about a first axis, a second vibratory motor having a second rotatable eccentric weight adapted to rotate about a second axis, a third vibratory motor having a third rotatable eccentric weight adapted to rotate about a third axis, and a fourth vibratory motor having a fourth eccentric weight adapted to rotate about a fourth axis, said first and second axis being located substantially in a first plane and said third and fourth axis being located substantially in a second plane, said second plane being non-coplanar with said first plane said first and second axis being spaced from said third and fourth axis along the direction the material is conveyed, said first rotatable eccentric weight and said second rotatable eccentric weight and said third rotatable eccentric weight and said fourth eccentric rotatable weight being free-wheeling with respect to one another, said first vibratory motor and said second vibratory motor and said third vibratory motor and said fourth vibratory motor being adapted to operate at substantially the same operating speed and to provide an output force generally perpendicular to its axis of rotation, said first rotatable eccentric weight and said second rotatable eccentric weight and said third rotatable eccentric weight and said fourth eccentric rotatable weight are adapted to accumulatively synchronize with one another without being rotationally coupled to one another such that the combined resulting output force of a first pair of rotatable eccentric weights is parallel to said line of stroke and the combined resulting output force of a second pair of rotatable eccentric weights;
   operating said first vibratory motor and said second vibratory motor and said third vibratory motor and said fourth vibratory motor to rotate said first rotatable eccentric weight and said second rotatable eccentric weight and said third rotatable eccentric weight and said fourth eccentric rotatable weight such that said first rotatable eccentric weight and said second rotatable eccentric weight and said third rotatable eccentric weight and said fourth eccentric rotatable weight accumulatively synchronize and accumulatively add their output forces and their respective power outputs and thereby vibrate said bed along said line of stroke at a vibration frequency; and
   operating said first vibratory motor and said second vibratory motor and said third vibratory motor and said fourth vibratory motor at substantially the same selected operating speed which approaches being equal to, or is less than, the natural frequency of said plurality of drive springs which are vibrating said bed; and
   using a programmable motor control unit and providing a standard variable frequency combined with an adjustable timer creating a vibratory stroke of 50 Hz for 25 seconds and an automatic momentary pulsing of at least 60 hertz of from 3 to 5 seconds enabling a full zero to maximum output adjustment.

2. The vibrating screening and feeding process of claim 1, including the step of selecting a three phase alternating current vibratory motor for said first vibratory motor, said second vibratory motor, said third vibratory motor, and said fourth vibratory motor.

3. The vibrating conveyor screening and feeding process of claim 1, including the step of uniformly adjusting the vibration frequency of said bed by electrically adjusting the rotational speed of said first vibratory motor and said second vibratory motor and said third vibratory motor and said fourth vibratory motor, while operating at substantially the same rotational speed with respect to one another.

4. The vibrating conveyor screening and feeding process of claim 1, including the step of adjusting a rate of feed by adjusting an operating stroke and a frequency of said plurality of drive springs and said plurality of stabilizers.

5. The vibrating conveyor screening and feeding process of claim 1, including the step of rotating said first rotatable eccentric weight and said second rotatable eccentric weight in opposite directions relative to one another, and rotating said third rotatable eccentric weight and said fourth rotatable eccentric weight in opposite directions relative to one another.

6. The vibrating conveyor screening and feeding process of claim 1, including the step of conveying material on said bed comprising a vibrating screen housing and at least one screen in flow communication with a pan extending the width and length of said bed, said vibrating screen housing including a plurality of downward extending abutments on a bottom surface of said bed fixedly connecting to a plurality of said drive springs mounted at an angle to a longitudinal counterbalance supported by a plurality of isolation springs extending upward from a base, said longitudinal counterbalance including said plurality of vibratory motors mounting to a selected end thereof with said plurality of stabilizers extending upward from said longitudinal counterbalance to said downward extending abutments.

7. The vibrating screening and feeding process of claim 6, including the step of selecting said plurality of isolation springs and said plurality of drive springs from steel coil springs wherein said plurality of drive springs are stiffer than said plurality of isolation springs.

8. The vibrating screening and feeding process of claim 1 including the step of selecting a defined stroke angle perpendicular to an axial centerline of said plurality of stabilizers and in line with an axial centerline of said plurality of drive springs, whereby a vibrating screening feeder is dynamically counter-balanced.

9. The vibrating conveyor screening and feeding process of claim 1, including the step of operating said first vibratory motor and said second vibratory motor and said third vibratory motor and said fourth vibratory motor at an operating frequency below the resonance point of said drive springs.

10. The vibrating conveyor screening and feeding process of claim 1, including the step of mounting an eccentric weight on an output shaft extending from a top end and a bottom end of each one of said plurality of vibratory motors in mechanical time with one another.

11. The vibrating conveyor screening and feeding process of claim 1, including the step of using a programmable motor control unit capable of controlling said plurality of vibratory motors synchronized with one another at a selected speed, and periodically changing said selected speed for a selected time interval by a selected amount.

12. The vibrating conveyor screening and feeding process of claim 1, including the step of producing a first portion of a load with said drive springs opposing vibratory motion, said plurality of stabilizers guiding said vibratory motion, and said plurality of vibratory motors producing a remaining portion of said load opposing said vibratory motion.

* * * * *